United States Patent
Dasgupta et al.

(10) Patent No.: US 10,607,042 B1
(45) Date of Patent: Mar. 31, 2020

(54) DYNAMICALLY TRAINED MODELS OF NAMED ENTITY RECOGNITION OVER UNSTRUCTURED DATA

(71) Applicant: LIVE OBJECTS, INC., Palo Alto, CA (US)

(72) Inventors: Sudipto Shankar Dasgupta, Sunnyvale, CA (US); Kamesh Raghavendra, Bangalore (IN)

(73) Assignee: Live Objects, Inc., Palo Alto, CA (US)

( * ) Notice: Subject to any disclaimer, the term of this patent is extended or adjusted under 35 U.S.C. 154(b) by 0 days.

(21) Appl. No.: 16/670,653

(22) Filed: Oct. 31, 2019

Related U.S. Application Data

(63) Continuation-in-part of application No. 16/540,530, filed on Aug. 14, 2019.

(30) Foreign Application Priority Data

Feb. 12, 2019 (IN) .............................. 201941005513

(51) Int. Cl.
*G06F 40/295* (2020.01)
*G06N 5/02* (2006.01)
*G06F 40/56* (2020.01)
*G06F 40/253* (2020.01)

(52) U.S. Cl.
CPC .......... *G06F 40/295* (2020.01); *G06F 40/253* (2020.01); *G06F 40/56* (2020.01); *G06N 5/02* (2013.01)

(58) Field of Classification Search
None
See application file for complete search history.

(56) References Cited

U.S. PATENT DOCUMENTS

| | | | |
|---|---|---|---|
| 5,182,794 A | 1/1993 | Gasperi et al. |
| 5,890,133 A | 3/1999 | Ernst |
| 6,763,353 B2 | 7/2004 | Li et al. |
| 7,120,896 B2 | 10/2006 | Budhiraja et al. |
| 7,162,458 B1 | 1/2007 | Flanagan et al. |

(Continued)

OTHER PUBLICATIONS

Agrawal, R. et al., "Mining Process Models from Workflow Logs," International Conference on Extending Database Technology, Jan. 22, 1998, pp. 1-21.

(Continued)

*Primary Examiner* — Alan Chen
(74) *Attorney, Agent, or Firm* — Fenwick & West LLP

(57) ABSTRACT

A computing server configured to process data of a domain from unstructured data sources to generate natural language phrases describing relationships between entities identified from the unstructured data. The computing server may receive master data schema and domain knowledge ontology of a domain including relationship definitions in the domain. The computing server may identify targeted types of named entities of the domain from the master data schema according to the relationship definitions in the domain knowledge ontology. The computing server may extract a plurality of named entities from unstructured data of the domain. The computing server may generate one or more sequences of named entities and assign entity labels to the named entities. The computing server may, based on the entity labels, generate natural language phrases describing relationships of sets of named entities.

17 Claims, 9 Drawing Sheets

(56) References Cited

U.S. PATENT DOCUMENTS

| | | | |
|---|---|---|---|
| 8,036,907 B2 | 10/2011 | Davies et al. | |
| 8,166,013 B2 | 4/2012 | Bandaru et al. | |
| 9,176,951 B2 | 11/2015 | Patrudu et al. | |
| 2004/0210552 A1 | 10/2004 | Friedman et al. | |
| 2016/0140236 A1 | 5/2016 | Estes | |
| 2016/0247087 A1* | 8/2016 | Nassar | G06F 16/316 |
| 2016/0253364 A1* | 9/2016 | Gomadam | G06F 16/353 |
| | | | 707/739 |
| 2017/0109657 A1 | 4/2017 | Marcu et al. | |
| 2018/0032861 A1 | 2/2018 | Oliner et al. | |
| 2018/0146000 A1 | 5/2018 | Muddu et al. | |
| 2018/0219889 A1 | 8/2018 | Oliner et al. | |
| 2018/0232443 A1* | 8/2018 | Delgo | G06F 17/278 |
| 2018/0253653 A1* | 9/2018 | Ozcan | G06N 5/022 |
| 2018/0322283 A1 | 11/2018 | Puri et al. | |
| 2019/0018904 A1* | 1/2019 | Russell | G06F 16/9024 |
| 2019/0102430 A1* | 4/2019 | Wang | G06F 16/24549 |
| 2019/0303441 A1* | 10/2019 | Bacarella | G06N 20/00 |

OTHER PUBLICATIONS

Chen, D. et al., "A Fast and Accurate Dependency Parser using Neural Networks," Proceedings of the 2014 Conference on Empirical Methods in Natural Language Processing (EMNLP), Oct. 25-29, 2014, pp. 740-750, Doha, Qatar.

Explosion AI, "Architecture: Library architecture," undated, three pages, May be Retrieved at<URL:https://spacv.io/api/>.

Hochreiter, S. et al., "Long Short-Term Memory," Neural Computation, Nov. 15, 1997, pp. 1735-1780, vol. 9, Issue 8.

Kiperwasser, E. et al., "Simple and Accurate Dependency Parsing Using Bidirectional LSTM Feature Representations," Transactions of the Association for Computational Linguistics, Jul. 2016, pp. 313-327, vol. 4.

Lafferty, J. et al., "Conditional Random Fields: Probabilistic Models for Segmenting and Labeling Sequence Data," Proceedings of the $18^{th}$ International Conference on Machine Learning, Jun. 28, 2001, pp. 282-289.

Lipton, Z. et al., "A Critical Review of Recurrent Neural Networks for Sequence Learning," arXiv preprint arXiv:1506.00019, Jun. 5, 2015, 38 pages.

Miller, E. "An Introduction to the Resource Description Framework." Bulletin of the American Society for Information Science, Oct./Nov. 1998, pp. 15-19.

Pennington, J. et al., "Glove: Global Vectors for Word Representation," Proceedings of the 2014 Conference on Empirical Methods in Natural Language Processing (EMNLP), Oct. 25-29, 2014, pp. 1532-1543, Doha, Qatar.

Rubin, V., et al., "Process Mining Framework for Software Processes." International Conference on Software Process, May 2007, 21 pages.

Rubin, V., et al., "Process Mining Framework for Software Processes," undated, 12 pages, May be Retrieved at<URL:http://www.processmining.org/_media/publications/wvdaalst_p401.pdf>.

Steinbach, M. et al., "A Comparison of Document Clustering Techniques," KDD Workshop on Text Mining, Aug. 20-23, 2000, 20 pages.

Van Der Aalst, W. et al., "ProM: The Process Mining Toolkit." Proceedings of the Business Process Management Demonstration Track (BPMDemos 2009). Sep. 8, 2009, 49 pages, Ulm, Germany.

* cited by examiner

DYNAMICALLY TRAINED MODELS OF NAMED ENTITY RECOGNITION OVER UNSTRUCTURED DATA

CROSS-REFERENCE TO RELATED APPLICATIONS

The present application is a continuation-in-part of U.S. patent application Ser. No. 16/540,530, filed on Aug. 14, 2019, which claims the benefit of Indian Provisional Patent Application 201941005513, filed on Feb. 12, 2019, both of which are hereby incorporated by reference in their entirety.

TECHNICAL FIELD

The present disclosure generally relates to automatic extraction of named entities from a domain, and more specifically, to dynamically trained models that extract named entities from unstructured data.

BACKGROUND

Various domains are often associated with their own data structure, data sources, and ontology definitions related to the data and other aspects. A domain may include heterogeneous data such as unstructured data that may include text, files, and documents stored in various computers and structured data that may be defined by various schemas in one or more databases. It is challenging to process a large amount of data that could be distributed among various heterogeneous sources that are not easily identified and managed. Conventional techniques available for processing text and documents involve labor intensive data generation techniques such as manual identification and categorization of objects and attributes in the text and documents.

The conversion of unstructured files and documents to structured data that is organized in a manner easily accessible by a domain may often be too costly to perform consistently to capture all potential changes in unstructured files. For example, a domain may generate a large number of documents and files every second. Conventionally, while the existence or creation of those files may be captured by the domain, information included in the unstructured documents and files may contain important data that are not often automatically converted to a format that is easily accessible from a database. Also, even if some of the information is converted to structured data, data from various sources is often not sufficiently linked to provide meaningful insights regarding the domain.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed herein relates to information extraction, and more particularly to entity and relationship extraction from unstructured data.

By way of example, in one embodiment, a computing server may retrieve and analyze data schemas in a domain and train a machine learning model to identify the types of objects of interest. Objects identified in various unstructured sources may be converted to other representations such as embedding vectors in a multi-dimensional space that represent the objects' relationships among other data in the domain. Sequences of objects and events may be generated from the embedding vectors using a neural network such as long short-term memory to connect data and objects from various sources. A consolidated model representing a sequence of objects and activities. This allows a computing server to automatically and reliably extract meaningful sequences whose constituent information may be scattered among various unstructured data sources and conventionally is too expensive or labor intensive to identify or to compile as useful information.

Example System Environment

Figure 1:
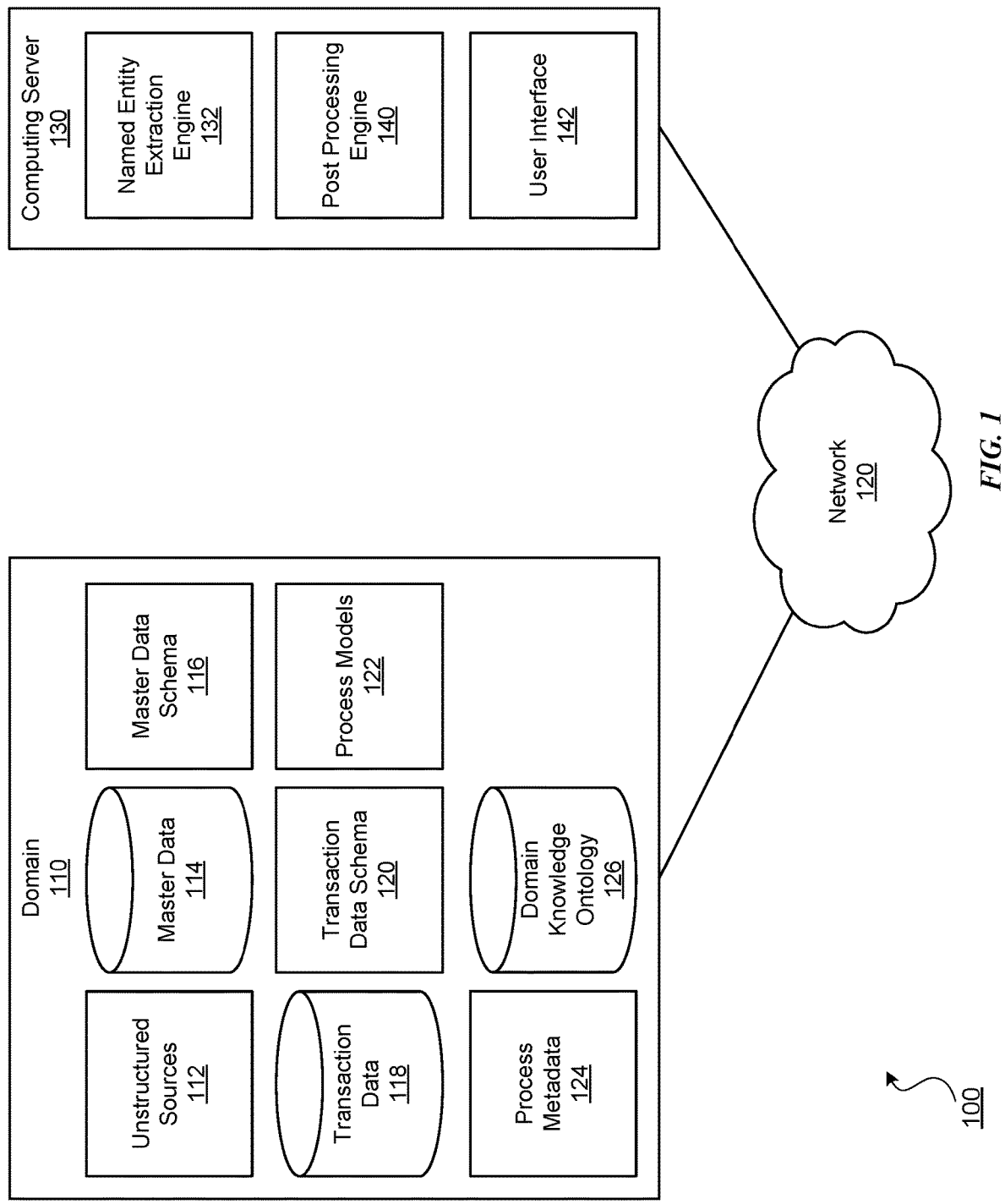
FIG. 1 is a block diagram illustrating an example system environment, in accordance with an embodiment.

Referring now to FIG. 1, shown is a block diagram illustrating an example system environment 100 for extracting named entities and generating entity relationship models from a domain 110, in accordance with an embodiment. The system environment 100 may include a domain 110, a network 120, and a computing server 130. In various embodiments, the system environment 100 may include fewer or additional components. The system environment 100 also may include different components.

A domain 110 may be an environment in which a system operates and/or an environment of a group of units and individuals that use common domain knowledge to organize activities, information, and entities related to the domain in a specific way. An example of a domain 110 may be an organization, such as a business, an institute, or a subpart thereof. A domain 110 may be associated with a specific domain knowledge ontology, which could include representations, naming, definitions of categories, properties, and relationships among various concepts, data, and entities that are related to the domain 110. For example, a first domain may be a first organization that has its own definitions of terms and criteria on what a specific task is considered completed, while a second domain, which could be a different organization, may have different sets of definitions of terms and different sets of tasks and entities that are related to the second domain. In some embodiments, a single organization may be associated with multiple domains. For example, each department of the organization may have different definitions, internal procedures, tasks, and entities. In other embodiments, multiple organizations may share the same domain. The domain may be configured to execute processing on a computing system, for example, a computing system with one or more of the computing system components illustrated and described with FIG. 9.

The computing server 130 may include one or more computing devices that cooperate to perform various tasks related to the domain 110 such as extracting named entities in the domain 110, identifying relationship among various entities, automatically generating transaction flows occurred within the domain 110. The computing server 130 may be a distributed computing system. The computing server 130 may perform the analyses and named entity recognition tasks for the domain 110 as a form of cloud-based software, such as software as a service (SaaS), through the network 120. For example, the computing server 130 may retrieve various information such as data, metadata and schemas via suitable communication channels of the domain 110 such as through the domain's application program interface (API). The computing server 130 may perform calculations and analysis of the retrieved data and present the results through a graphical interface. Alternatively, or additionally, to the SaaS, the computing server 130 may also perform the tasks as a form on on-premise software.

The network 120 provides connections to the components of the system environment 100 through one or more sub-networks, which may include any combination of local area and/or wide area networks, using both wired and/or wireless communication systems. In one embodiment, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML), extensible markup language (XML), JavaScript object notation (JSON), structured query language (SQL). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet. In some cases, the computing server 130 may belong to a part of the internal computing system of the domain 110. In such cases, the network 120 may be a local network that enables the computing server 130 to communicate with the rest of the components of the domain 110.

Referring to the domain 110, it may include various data and ontologies that define its knowledge and nomenclature. The domain 110 may include unstructured sources 112, master data 114, master data schema 116, transaction data 118, transaction data schema 120, organization process models 122, organization process metadata 124, and domain knowledge ontology 126. In various embodiments, the domain 110 may include fewer or additional components. The domain 110 also may include different components.

Unstructured sources 112 includes various data sources that store information and data that are generated throughout the course of operations of the domain 110. Unstructured data often does not have a pre-defined data structure and may include a large amount of text. For example, unstructured data may include information that is in natural languages such as the text in emails. An email server that stores the emails of the domain's employees may be an example of an unstructured source 112. Other examples of unstructured sources 112 may include documents and files stored in different computers of the domain 110, chat logs, PDF documents, word documents, text documents, scanned document images, etc. Unstructured data may also include other information that is not entirely in natural languages such as call logs, machine logs (bot logs), process logs, etc. The different unstructured sources 112 and other structured sources may represent heterogeneous data sources of the domain 110.

Master data 114 may include information of relevant entities and objects in the domain 110. For example, master data 114 may describe parties, locations, and other objects around which the domain's businesses and events are conducted. The things that are recorded in the master data 114 may include customers, products, employees, assets, materials, suppliers, vendors, geographical locations, sites, etc. Master data 114 may be saved in a structured manner such as SQL, another relational structure, or another suitable data format, which may include key-value pairs. For example, master data 114 may take the form of identifiers that may uniquely associate a named entity or another object of the domain 110 with a data entry. Master data 114 may also include extended attributes that describe the qualities and other characteristics of the named entities or other objects. An example entry of master data 114 for an employee of the domain 110 may include the employee's unique identifier that takes the form of a hash or a uniform resource identifier (URI) as a primary key, a type identifier that identifies the entry as an entry for employees, metadata associated with the entry, name of the employee, and various values that describe characteristics such as email address, address, date of employment, etc. of the employee. The example entry of master data 114 may also include other child entries such as keys of other structured entries that are associated with the employee. The child entries may or may not be master data 114. The keys associated with the example entry may represent other key-value entries. For example, the entry may include the keys of master data entries of customers to describe the relationships between the employee and the customers. The entry also may include the keys of transaction data entries to associate the employee with transactions that involve the employee.

The master data schema 116 describes the relationships, structure, and hierarchies of various types of master data 114. For example, the master data schema 116 may take the form of a blueprint that describes the structure of the database of the master data 114. The blueprint may describe a collection of schema objects and the connections, structure, and hierarchies of the schema objects. Schema objects may include tables, sequences, synonyms, indexes, clusters, links, procedures, functions, etc. For example, the master data schema 116 may include a table that describe a type of master data entries (e.g., employee entries), the primary key and foreign keys allowed to be associated with the type of entries, fields of attributes that are available for the type of entries, and potential connections between fields and other types of entries. An example connection between a field and another type of entry may indicate that a particular attribute for an entry may be a foreign key that is linked to another table associated with another type of data. Components of the master data schema 116 may include tables, fields, field lengths, field types, field descriptions, foreign key relationships, primary key relationships, etc.

Transaction data 118 may include information about relevant activities and events that occur around the domain 110 such as transactions that are related to the named entities identified in the master data 114. For example, transaction data 118 may include information of sales, deliveries, invoices, claims, customer service tickets, and other interactions among various entities and objects associated with the domain 110. A transaction may include multiple events. Activities recorded in the transaction data 118 often may be associated with timestamps, although such timing information may be absent for some records. Transaction data 118 similarly may be saved in a structured manner such as SQL, another relational structure, or another data format, which may include key-value pairs. For example, an example entry of transaction data 118 for a manufacture transaction of the domain 110 may include the manufacture transaction's unique identifier that takes the form of a hash or a URI as the primary key, a type identifier that identifies the type of transaction (e.g., the type is a manufacture sequence), metadata associated with the entry, objects and entities associated with the manufacture transaction (e.g., product codes, material identifiers, etc.), and timestamps for the key events in the transactions (time for raw material received, time for item completion, etc.).

In general, master data 114 may be associated with objects or entities of the domain 110 while transaction data 118 may be associated with temporal events occurring around those objects and entities.

Similar to master data schema 116, transaction data schema 120 describes the relationships, structure, and hierarchies of various types of transaction data 118. For example, the transaction data schema 120 may take the form of a blueprint that describes the structure of the database of the transaction data 118. The blueprint may describe a collection of schema objects and the connections, structure, and hierarchies of the schema objects. Components of the transaction data schema 120 may include tables, fields, field lengths, field types, field descriptions, foreign key relationships, primary key relationships, etc.

The process models 122 may include data regarding various process models associated with the domain 110. For example, an example process model as defined by the domain 110 may be a sequence of events or processes that extracts entity or object information from unstructured sources 112 and generates a representation of the extracted information in natural language. In another example, in a sales transaction, an example process model as defined by the domain 110 may be a sequence of events that includes a confirmation of the order, a receipt of the payment, a retrieval of items from a warehouse, a shipment of the items, a confirmation of delivery of the items, and the close of the sales transaction. In another example, in a manufacture transaction, an example process as defined by the domain 110 may include reception of parts, storage of the parts, the creation of intermediate components, different stages of manufacturing, the packaging of the finished products, and storage of the products in a warehouse.

The domain 110 may initially create various process models 122 based on the practices of the organization associated with the domain 110. The domain 110 may receive refined or improved process models 122 based on suggestions of process variants transmitted from the computing server 130 after the computing server 130 analyzes the process models 122. The process models 122 also may be edited manually by humans or machines. The process metadata 124 stores metadata regarding the process models 122 such as the time of creation or modification of a process model, the author of a process model, changes in a process model, etc.

The domain knowledge ontology 126 may include data that represent knowledge, concepts, and the relationships among concepts that may be specific to the domain 110. Domain knowledge ontology 126 may include policies, rules, and relationship definitions. For example, the ontology for a business domain may describe known business rules dependent or independent of a particular business context. Domain knowledge ontology 126 may be represented by data in resource description framework (RDF) and/or web ontology language. Domain knowledge ontology 126 may include classes and relationships as the main components. A class may represent a concept such as a rule, a policy, an entity, or another suitable object in the domain 110. A relationship may describe the connection between two classes. An example piece of domain knowledge may be that shipment orders that start with the letter "I" are denoted as international shipment orders for a particular domain 110. Such a rule or practice may be captured in the ontology.

In one embodiment, the domain knowledge ontology 126 may be represented by data in an extensible markup language format such as RDF. The RDF format may be expressed as resource, property type, and property value triplets. The domain knowledge ontology 126 may represent an object (e.g., an entity, an item, a facility, a store) as a resource that is uniquely identifiable by a URI. The object in the form of a resource may be associated with different attributes that can be identified as property types. Each attribute value may be expressed as the property value. For example, property types express the relationship of values associated with resources. A value may take the form of a text string or numbers that could be atomic in nature, of another value that is divisible, or of another resource. A description of a resource may be a collection of the relationships among different property types and values associated with the resource, which is linked to other resources through property value. Some of the resources in the domain knowledge ontology 126 may be entries of master data 114.

The property types of some resources in the domain knowledge ontology 126 may be entries of master data 114 and entries of transaction data 118. For example, an entry of the domain knowledge ontology 126 may specify, within the domain 110, a store ABC (a resource) has a store manager (property type) who is John Smith (property value, also a resource), which is expressed as a triplet. John Smith in turn has other different property types such as email address (atomic text strings), employee identifier (number), supervisees (other resources), returns approved by the store manager (transaction data), etc. that can be expressed by other triplets. The entries for the store ABC, John Smith and his supervisees may be named entities that are stored as a part of the master data 114. The returns records approved by John Smith may be stored as a part of transaction data 118. The ontology also may map similar business entities and store parent-child relationships between business entities.

In one embodiment, the domain 110 may impose a syntax requirement such as a formal structure that is compatible with XML on the domain knowledge ontology 126 and may allow users to define semantics using various customizable namespace conventions designed by the users. The domain knowledge ontology 126 also may be associated with a schema that defines the relationship between different property types, types of resources, available property types for a particular kind of resource, etc.

Referring to computing server 130, it includes various components that perform named entity extractions and analyses of transactions occurred around the domain 110. The computing server 130 may include named entity extraction engine 132, post-processing engine 140, and user interface 142. In various embodiments, the computing server 130 may include fewer or additional components. The computing server 130 also may include different components. The functions of the computing server 130 may be distributed among the components in a different manner than described. Each engine in the computing server 130 may include software algorithms that work with hardware as described in FIG. 9.

The named entity extraction engine 132 may extract named entities from various documents and files of the domain 110 such as from the unstructured sources 112. A named entity may be an object that is related to the domain 110, such as a person, a location, an organization, an item, an electronic product, etc. The named entity extraction engine 132 may automatically extract named entities from unstructured sources 132 to identify events that occur around the extracted named entities. For example, the named entity extraction engine 132 may retrieve the master data schema 116 and the transaction data schema 120 of the domain 110. Based on the master data schema 116 and the transaction data schema 120, the named entity extraction engine 132 may identify types of named entities in unstructured data 112 that need to be extracted. The unstructured data 112 may include text that provides the context of the activities occurred around the extracted entities. The named entity extraction engine 132 may identify those activities. The named entity extraction process will be discussed in more detail in association with FIGS. 3, 4, and 5.

The post-processing engine 140 may perform post-processing of the results that are generated by the named entity extraction engine 132. Post-processing may include enriching the generated results with domain knowledge ontology 126, refining the generated entity relationships and logics based on manual inputs, and updating the domain 110 with new domain knowledge ontology based on extracted relationships. The post-processing will be discussed in more detail in association with FIG. 6.

Figure 8:
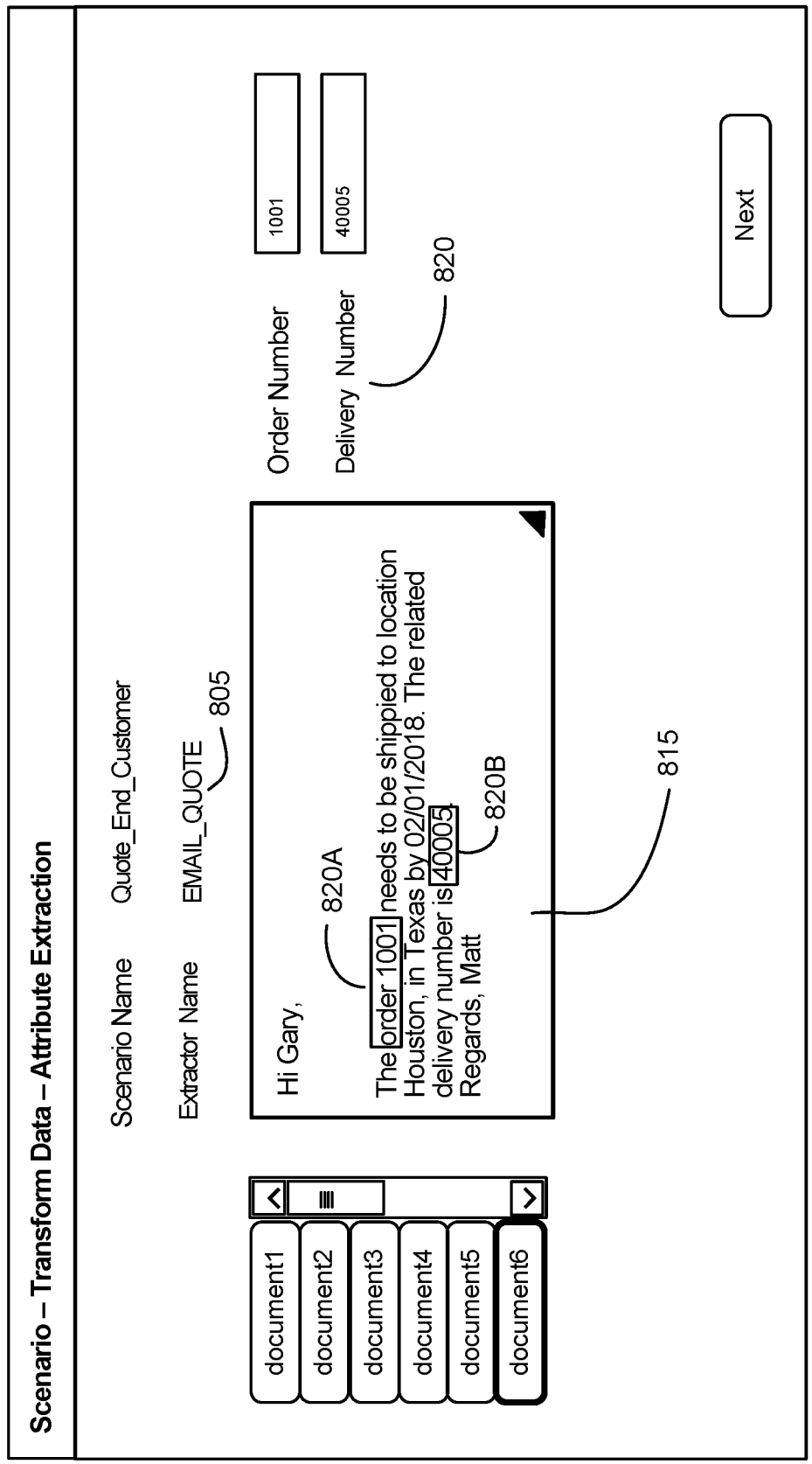
FIG. 8 is an example interface illustrating a natural language phrase describing a relationship of a set of named entities based on unstructured data, in accordance with an embodiment.

The user interface 142 may provide an interface to transmit and display results and measurements generated from the analysis performed by the computing server 130. The user interface 142 may take different forms. In one embodiment, the user interface 142 may be an application interface that is provided and controlled by the computing server 130. For example, the computing server 130 may provide the results of its analysis through cloud-based SaaS. The user interface 142 may be a front-end software application that can be installed, run, and/or displayed at a client device for users of the domain 110. The user interface 142 also may take the form of a webpage interface of the computing server 130 to allow clients to access data and results through web browsers. The user interface 142 may include a graphical user interface (GUI) that displays various results and data analyzed by the computing server 130, such as an automatically generated transaction sequence presented in a natural language phrase, as shown in FIG. 8. In another embodiment, the user interface 142 may not include graphical elements but may provide other ways to communicate with the domain 110, such as application program interfaces (APIs).

Figure 2:
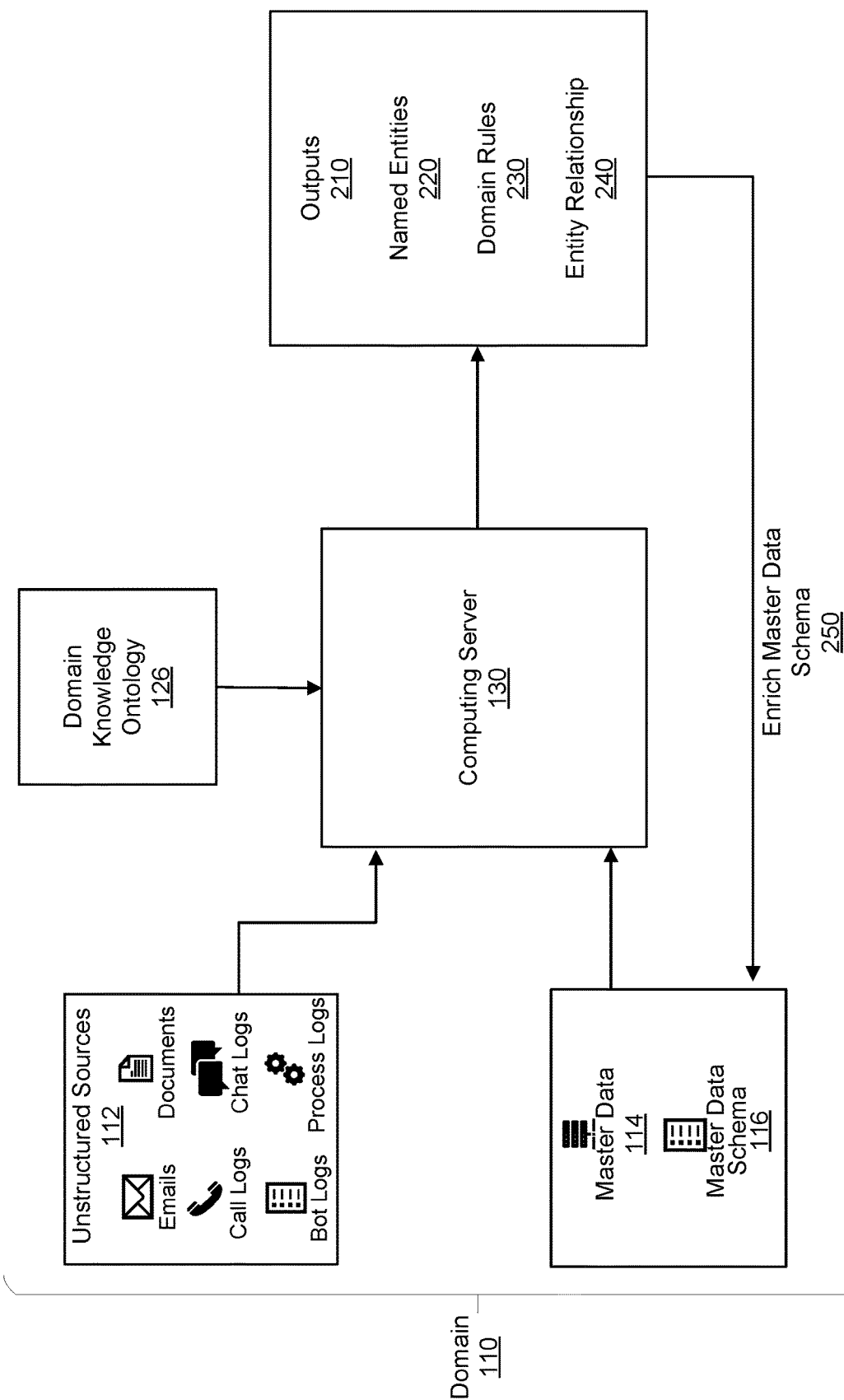
FIG. 2 is a block diagram illustrating example inputs and outputs of a computing server, in accordance with an embodiment.

FIG. 2 is a block diagram illustrating example inputs and outputs for the computing server 130, in accordance with an embodiment. The computing server 130 may communicate with the domain 110 through one or more communication channels, cloud synchronization, and/or APIs. The computing server 130 may receive different data from the domain 110, including data from unstructured sources 112, master data 114, master data schema 116, transaction data 118, transaction data schema 120, process models 122, process metadata 124, and domain knowledge ontology 126. The input domain knowledge ontology 126 may be in an RDF format. Using different data extract techniques and analyses, the computing server 130 generates outputs 210 that are related to the processes that occur around the domain 110. The outputs 210 may include different types, including named entities 220, domain rules 230, and entity relationships 240. The outputs 210 are transmitted to the domain 110 to update the master data 114 and to enrich the master data schema 116, as indicated by the arrow 250. The outputs 210 may also receive human or machine feedback before the master data 114 and master data schema 116 are updated at the domain 110.

The outputs 210 include named entities 220, which represent real-world objects, including persons, locations, organizations, products, etc., that are relevant to or associated with the domain 110. The domain rules 230 may describe the knowledge, concepts, relationships between concepts, policies, rules, and relationship definitions associated with the domain 110. The entity relationships 240 may describe connections between one or more named entities 220 or between one or more classes of the domain 110. The outputs 210 may be used by the computing server 130 to describe relationships and entities of the domain 110 in natural language form.

Example Process Model Generation Flow

Figure 3:
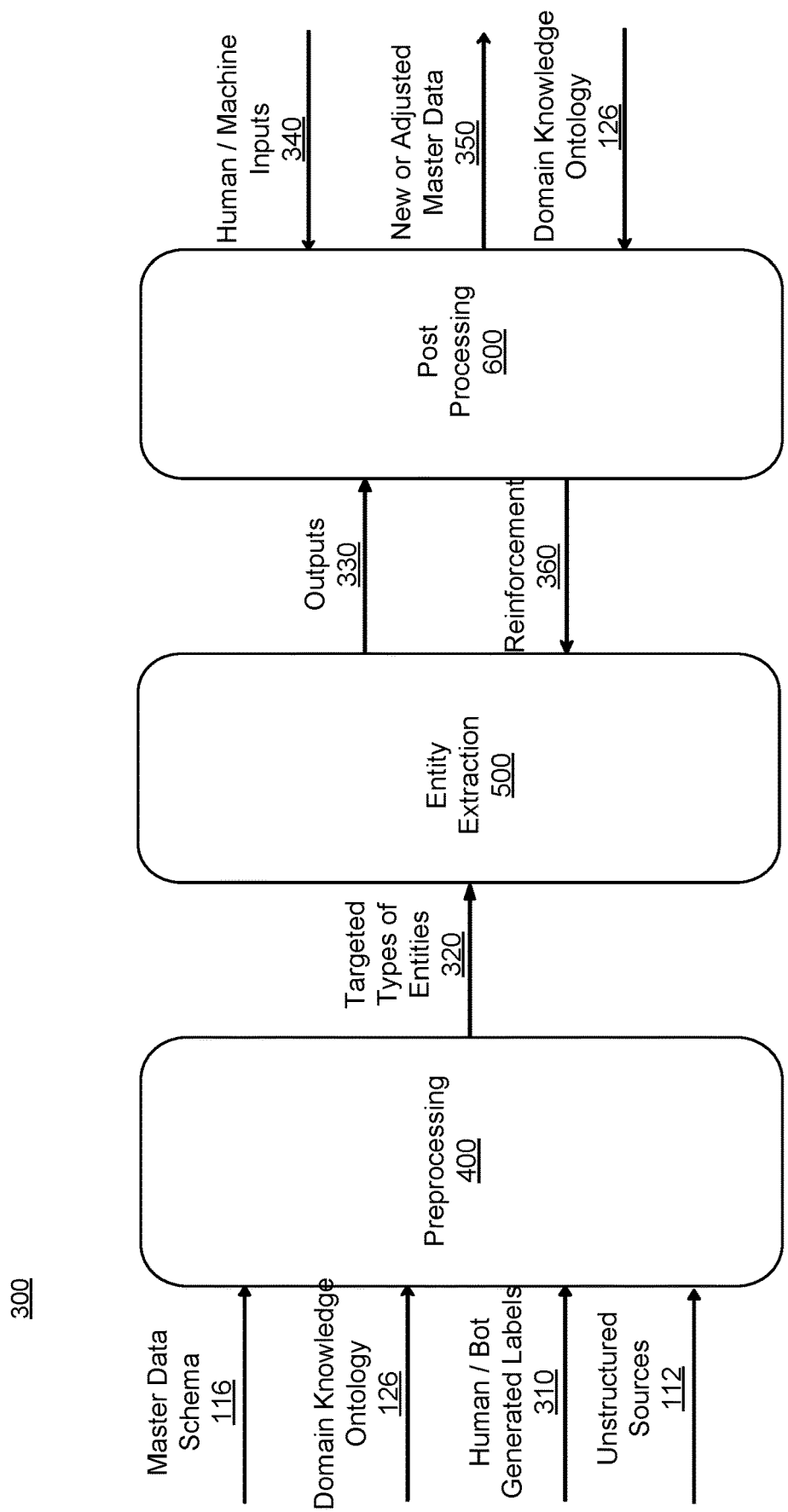
FIG. 3 is a block diagram illustrating an example flow to extract named entities from data of a domain, in accordance with an embodiment.

FIG. 3 is a block diagram illustrating an example flow 300 to generate a process model from data of a domain 110, in accordance with an embodiment. The example flow 300 may be performed by various components of the computing server 130. The example flow 300 may include a preprocessing stage 400, an entity extraction stage 500, and a post-processing stage 600. A flow in accordance with other embodiments may include different, fewer or additional stages. Each step in the illustrated flow may be captured as a processing engine corresponding to the particular functionality described herein. Further, the processing engines may be executed on a computing system, for example, a computing system having some or all of the components illustrated and described with FIG. 9.

In the preprocessing stage 400, the computing server 130 identifies types of named entities to be labeled in accordance with the master data schema 116 of the organization. In one embodiment, the computing server 130 may read the organization's master data scheme, which may include information that describes structures and relationships between different types of entities in the organization. The computing server 130 may extract some of the relationships between various entity types. The extraction process may include converting the business grammar in the master data schema into an RDF format. The computing server 130 may also augment the extracted relationships with domain knowledge ontology 126 of the organization. Based on the extracted relationships, the computing server 130 may identify types of named entities 320 that should be labeled by the server.

In the named entity extraction stage 500, the computing server 130 extracts named entities and activities related to those entities from unstructured sources 112 and other data sources. An activity may be an instance of the occurrence of a particular event around the domain 110. Events, such as orders, payments, deliveries, etc., may be categories of various activities. For example, the activity recorded in a data log representing "the bar code of item #1234 scanned at the admission of warehouse A" may be an example of an instance of occurrence of the event "start of storage at warehouse." Another activity recorded in an email stating "I put item #2342 at warehouse B at 5 p.m." may be another example of an instance of the occurrence of the event "start of storage at warehouse."

During the named entity extraction stage 500, the computing server 130 also may label activities with timestamps to generate one or more activity time sequences that occur around the named entities as appeared in the unstructured sources 112. To generate the outputs of the named entity extraction stage 500, the computing server 130 may rely on data such as master data schema 116, domain knowledge ontology 126, human/machine generated labels 340, human/machine corrections 312, and transaction schema 120. The human/machine generated labels 340 may be labels that are manually added to objects that appear in unstructured sources 112. For example, a user may specify that a person as a customer by labeling the person's name stored in a database as a customer. The human/machine corrections 312 may manually correct named entities or events that are automatically identified. For example, a user may manually correct the label of an employee (a named entity) that is misidentified as a customer.

In the named entity extraction stage 500, the computing server 130 may retrieve data from unstructured sources 112 and use one or more machine learning models to extract named entities and activities based on the targeted types of entities 320. The computing server 130 may identify named entities from unstructured data of the domain 110 and from other databases. The computing server 130 also may identify activities associated with the named entities as appeared in the unstructured sources 112 and transaction data 118 to generate one or more activity time sequences. The outputs 330 may include the named entities and the activities time sequences. For example, in one embodiment, the outputs generated in named entity extraction stage 500 may be a sequence of activities that involve different named entities. The sequence may be expressed in natural language.

In the post-processing 600, the computing server 130 further enriches the outputs 330 generated in the entity extraction stage 500. The refinement includes reading human/machine inputs 340 that manually corrects errors in the outputs 340, such as errors in the generated activity sequences. The computing server 130 may also augment the outputs 330 with domain knowledge ontology 126. The improved results are fed back to the process model stage 500 to reinforce 360 the algorithm and machine learning models used in the named entity extraction stage 500. The computing server 130 also provides the domain 110 with new or adjusted master data 350 and domain knowledge ontology 126 to update the master data 114 of domain 110.

Example Pre-Processing Stage

Figure 4:
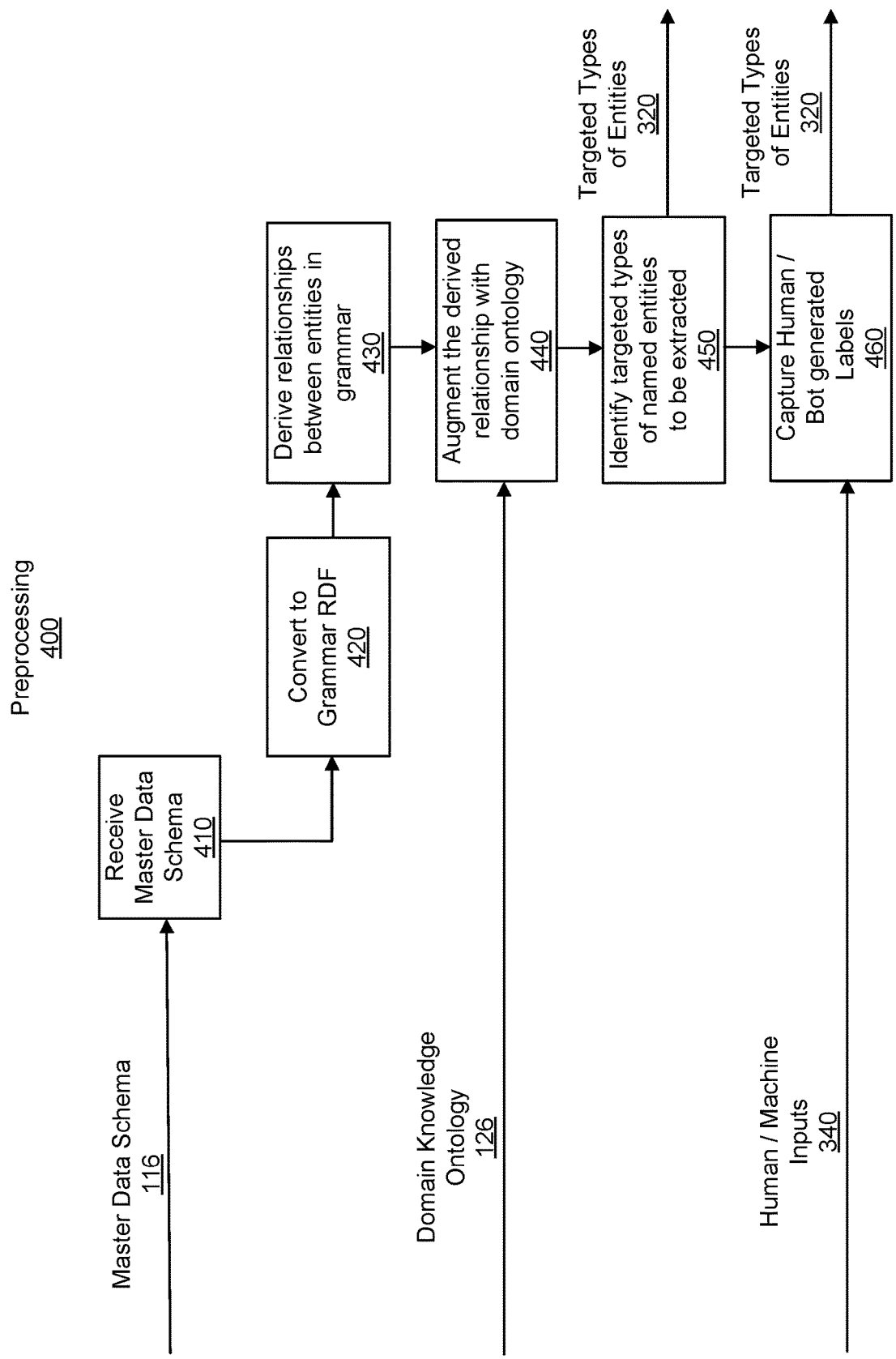
FIG. 4 is a block diagram illustrating an example preprocessing stage, in accordance with an embodiment.

FIG. 4 is a flowchart illustrating an example preprocessing stage, in accordance with an embodiment. In this stage 400, the computing server 130 may identify targeted types of entities 320 to be extracted in the entity extraction stage 500. The computing server 130 may additionally generate or process input labels and text blocks for use in downstream processes by the entity extraction stage 500 or the post-processing stage 600.

By way of example, the computing server 130 receives 410 inputs of various types from the domain 110. The inputs may include master data schema 116, domain knowledge ontology 126, and human/bot generated labels 340. In one embodiment, the master data schema 116 may be read from the master data system of the domain 110 using Java Database Connectivity (JDBC) and/or representational state transfer (REST) API based connectors. For example, the computer server 130 may make a request to the API system of the domain 110 for a URI that is associated with the master data schema 116. In response, the domain 110 transmits a payload that is formatted in XML or JSON with key-value pairs that include the data representing the master data schema 116. Data received by the computing server 130 may include master data tables, fields, field lengths, field types, field descriptions, foreign key relationships, primary key relationships, etc.

The computing server 130 converts 420 the master data schema 116 to an RDF-based business grammar. The RDF-based business grammar may be represented, for each entity in the master data schema 116, as a semantic triplet. Based on the RDF-based business grammar, the computing server 130 may derive 430 relationships between business entities. For example, relationship definitions in the domain 110 may be extracted from the master data schema.

The computing server 130 may superimpose or augment 440 the derived relationships between business entities with domain knowledge ontology 126 from the domain 110. Using the relationships determined, augmented with domain knowledge ontology or not, the computing server 130 identifies the targeted types of named entities that can be extracted from unstructured sources.

In determining the targeted types of named entities 320 needed to be extracted, the computing server 130 may rely on the master data schema 116 and/or the transaction data schema 120. For example, at least some of the types of named entities may correspond to values in the master data schema 116 or the transaction data schema 120. The values may be present in the tables, fields, field descriptions, available foreign keys, available primary keys as described in the data of the master data schema 116 or the transaction data schema 120.

Based on the master data schema 116 and/or the transaction data schema 120 specific to a domain 110, the types of named entities needed to be extracted may be specific to the particular domain 110. The computing server 130 may train one or more machine learning models to identify the types of named entities that are important to improving target processes of a particular domain 110. For example, for a domain 110 that focuses on retail business, the transaction data schema 120 may indicate that transactions that are related to sales of items to customers are an important process of the domain 110. The machine learning models may identify sales related named entities, such as salespersons, customers, stores, store locations, retail items, etc., to be extracted from unstructured sources. In a second domain for a software development company that aims to improve its delays in developing software applications, the machine learning models may identify research and development related named entities, such as engineers, executives, key deadlines, software features, etc., to be extracted from unstructured sources. For the second example domain, retail related named entities, such as salespersons or customer service representatives, may not be needed to be extracted.

In one embodiment, identifying targeted types of named entities 320 of the domain 110 from the master data schema 116 may include converting entity types defined in the master data schema 116 to a plurality of domain grammar definitions in a resource description framework format. The process may also include deriving relationships among the entity types in the domain grammar definitions and augmenting the relationships among the entity types with the domain knowledge ontology 126. Also, the computing server 130 then identifies the targeted types of named entities 320 from the plurality of domain grammar definitions.

In an embodiment, the computing server 130 may additionally capture 460 human or machine generated labels 340 and refine the generated plurality of labels and entities for extraction from the unstructured sources. A user may specifically provide a type of named entity that the computing server 130 needs to extract. In one embodiment, a user may manually examine the targeted types of entities 320 and determine whether the targeted types of entities 320 are relevant to the domain 110 for the purpose of named entity extraction. For example, the user may set that the purpose of the process and activity extraction may be related to manufacturing activities. The preprocessing stage, based on the machine learning model, may output targeted types of entities 320 that are directly related to manufacturing activities and other entities that may not be directly related to manufacturing activities. The users may manually examiner those entities to determine whether the entities should be included in the targeted types of entities 320. The computing server 130 transmits the targeted types of entities 320 and corresponding values to the entity extraction stage 500. The target types of entities 320 may be inputs for the entity extraction stage 500 to specify to the computing server 130 on the things that need to be labeled in named entity extraction. The labels may be tags that classify what a noun (e.g., a named entity) is in the domain. For example, a label may identify a named entity as an employee, a customer, a product name, etc.

Example Named Entity Extraction

Figure 5:
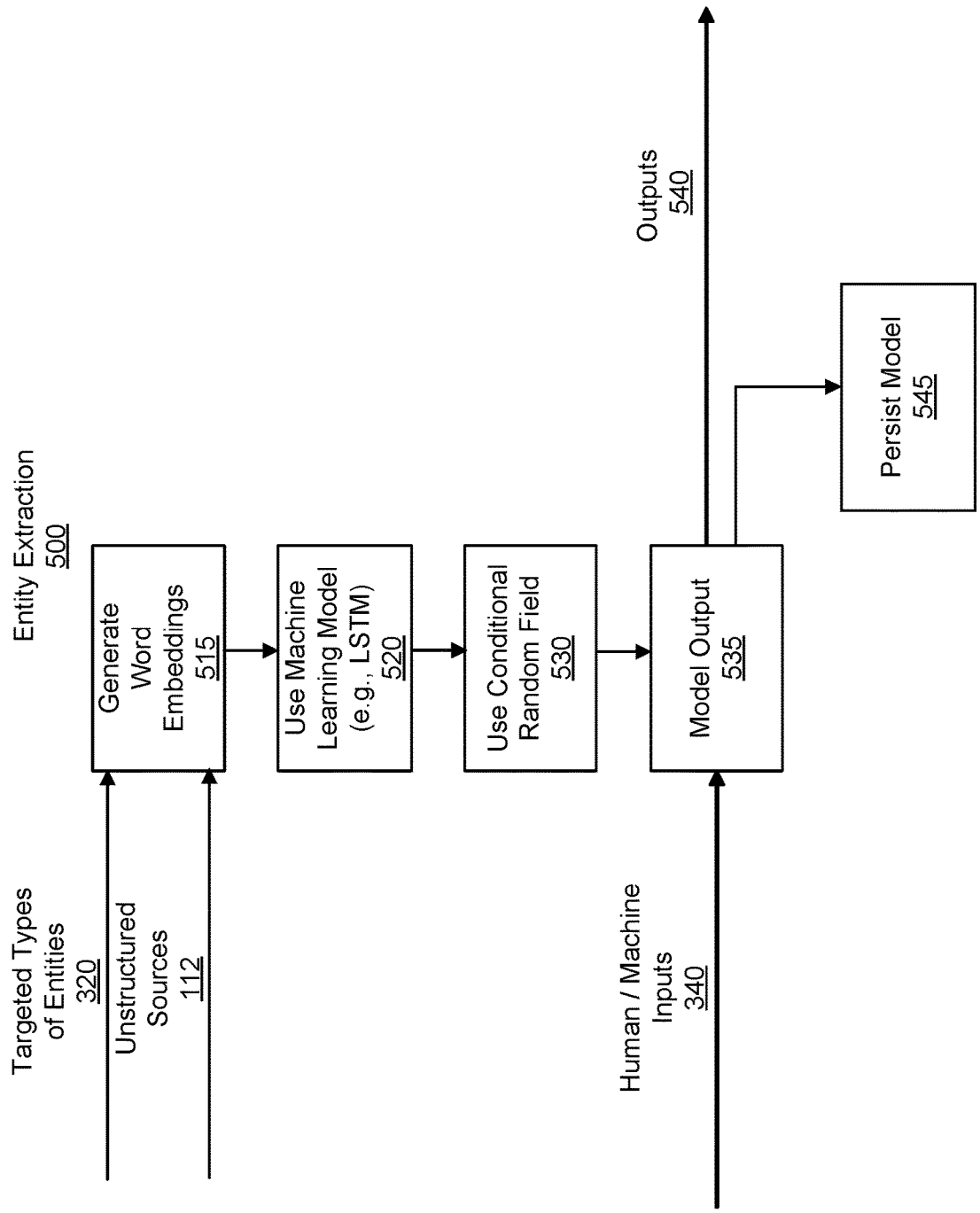
FIG. 5 is a block diagram illustrating an example named entity extraction stage, in accordance with an embodiment.

FIG. 5 is a flowchart illustrating an example named entity extraction stage 500, in accordance with an embodiment. In this stage 500, the computing server 130 may generate a list of activities that happened in the domain 110 and determine when those activities happened. The computing server 130 may extract named entities from unstructured sources 112 and identify activities occurred around the named entities as indicated by various documents from the unstructured sources 112. The computing server 130 also may automatically extract relevant time information from unstructured sources 112 and label extracted activities with timestamps.

Based on the identified activities, the computing server 130 generates natural language representations of the extracted entities and activities.

By way of example, the computing server 130 may receive inputs of various types from the domain 110. The inputs may include one or more of the following: master data schema 116, transaction data schema 120, human/machine generated labels 340, and unstructured data from unstructured sources 112. The computing server 130 may also receive the targeted types of entities 320 and the possible labels for the named entities. In one embodiment, the various inputs may be read from the domain 110 using Java Database Connectivity (JDBC) and/or representational state transfer (REST) API based connectors. For example, the computer server 130 may make a request to the API system of the domain 110 for a URI that is associated with the data requested. In response, the domain 110 transmits a payload that may be formatted in XML or JSON with key-value pairs that include the data representing the master data schema 116. Data received by the computing server 130 may include master data 114, transaction data 118, and domain knowledge ontology 126. The computing server 130 may also retrieve master data schema 116 and transactional data schema 120 in a similar manner using an API. The computing server 130 also downloads unstructured data from the domain 110 and retrieves human/machine generated labels 340.

The computing server 130 identifies target types of named entities 320 in unstructured data 112 of the domain 110 based on the master data schema 116 and other suitable data. In one embodiment, the identification of named entity may include two steps. First, the computing server 130 determines the types of named entities needed to be extracted, as shown in preprocessing stage 400. Second, the computing server 130 identifies named entities that fit the types in the unstructured sources 112. The computing server 130 uses named entity recognition techniques to extract named entities from unstructured data 112 such as text in emails and other documents stored in the computing server 130.

Based on the named entities identified, the computing server 130 also identifies activities that are associated with the named entities to generate sequences of named entities. The computing server 130 may identify the type of activities that are relevant to the target processes based on the nature of the target processes, the human/machine generated labels 340, and the transaction data schema 118. One or more machine learning models may be trained to identify relevant types of activities to be extracted for certain target processes. The computing server 130 may extract activities from the unstructured sources 112 such as by analyzing the context of emails and documents and by extracting activities from process logs. The computing server 130 also extracts timing information associated with the activities. The computing server 130 labels the activities with timestamps that are generated based on the timing information. Activities that are labeled with timestamps may be referred to as labeled activities.

The computing server 130 generates one or more natural language phrases describing relationships between named entities. A natural language phrase includes information describing one or more named entities and one or more related activity sequences. An activity sequence includes one or more labeled activities arranged in accordance with the timestamps. The natural language phrase may also be a sequence of named entities with labels. The generation of a sequence may include multiple steps. In one embodiment, the computing server 130 may convert words in the unstructured sources 112 to generate 515 word embeddings on the named entities extracted and other words related to the entities based on various input data, labels (e.g., types of the entities) of the entities), text content in unstructured sources 112, and label position in the text contents. A word embedding may be a vector in an n-dimensional space that represents the semantic relationships of the named entities relative to other words presented in the text of the unstructured source 112. In a natural language sentence, "Peter purchased a refrigerator model #123 at Santa Monica store" may be tagged with various label values by named entities recognition as "[Peter]$_{customer}$ purchased a [refrigerator]$_{item}$ model [#123]$_{model\_num}$ at [Santa Monica store]$_{store\_ID}$" In generating the vector, the computing server 130 relies on the named entities extracted, label values, text content, label position in the text content. The corpus in generating the word embeddings includes documents of the organization and documents from the domain 110. Pennington, Jeffrey, Richard Socher, and Christopher Manning, "Glove: Global vectors for word representation," Proceedings of the 2014 Conference on Empirical Methods in Natural Language Processing (EMNLP), 2014 is hereby incorporated by reference for all purposes.

The identified named entities' embeddings along with other embeddings may be input into a classifier that assigns labels to different identified named entities based on the contextual information represented by the embeddings. For example, in generating one or more activity sequences associated with one or more named entities, the computing server 130 may train and use 520 a recurrent neural network such as a long short-term memory (LSTM). An LSTM is a neural network that has feedback connections in one or more neurons. The architecture of the LSTM may include cells, regulators such as input gates, output gates, and forget gates. Hochreiter, Sepp, and Jurgen Schmidhuber. "Long short-term memory," Neural Computation 9.8 (1997): 1735-1780 is hereby incorporated by reference for all purposes. In one embodiment, the LSTM receives non-sequence word embedding vectors as inputs and sequences of named entities as outputs. One or more named entities in the sequences may be extracted from the unstructured sources 112. The outputs may also be activity sequences that include one or more labeled activities arranged in accordance with the timestamps. In training the LSTM, known activity sequences and known named entities represented by word embeddings may be used as training sets. Techniques such as coordinate descent, backward propagation, forward propagation are used to determine the gradient and adjust the weight factors of the neurons in the LSTM to reduce the errors for the LSTM in reconstructing the known activity time sequences based on the input word embeddings in the training sets.

Training of a neural network may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operations such as convolution of data with one or more kernels, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights) that are adjustable during training. In addition, some of the nodes in a neural network each may also be associated with an activation function that decides the weight of the output of the node in forward propagation. Common activation functions may include step functions, linear functions, sigmoid functions, hyperbolic tangent functions (tanh), and rectified linear unit functions (ReLU). The data in the training sequence may be converted to a feature vector or a time series. After a feature vector or a time series is inputted into the neural network and passes through a neural network in the forward propagation, the results may be compared to the training labels to determine the neural network's performance. The process of prediction may be repeated for other patients in the training sets to compute the value of the objective function in a particular training round. In turn, the neural network performs backpropagation by using coordinate descent such as SGD to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples.

After the LSTM is trained, the computing server 130 may generate activity sequences and sequences of named entities. The computing server 130 may assign entity labels to the named entities in one or more sequences based on the conditional probability that one entity should be present in the sequence given that another entity is already in the sequence. For example, the computing server 130 may use 530 a conditional random field to assign entity labels to the named entities in the sequences. The entity label for one of the named entities in a sequence may be assigned based at least on another entity label in the sequence. An entire sequence may also be labeled using a conditional random field. Lafferty, John, Andrew McCallum, and Fernando C N Pereira, "Conditional random fields: Probabilistic models for segmenting and labeling sequence data," (2001), is incorporated by reference for all purposes.

The computing server 130 also may receive manual corrections such as human/machine corrections 340 that are input to the computing server 130. The computing server 130 captures the manual corrections to adjust the output sequences and correct any discrepancies with the output sequences. The computing server 130 also may receive the domain knowledge ontology 126 from the domain 110. The computing server 130 may enrich the output activity time sequences based on the domain knowledge ontology 126.

Based on the identified named entities and sequences, the computing server 130 may generate 535 natural language phrases describing relationships of sets of named entities identified in the sequences. The computing server 130 may generate an interface displaying one or more of the natural language phrases for display. An example interface including a natural language phrase describing a relationship between a set of named entities is described further in conjunction with FIG. 8. For example, the phrase shown in FIG. 8 may be an example of natural language output 540 generated by the named entity extraction stage 500.

Example Post Processing

Figure 6:
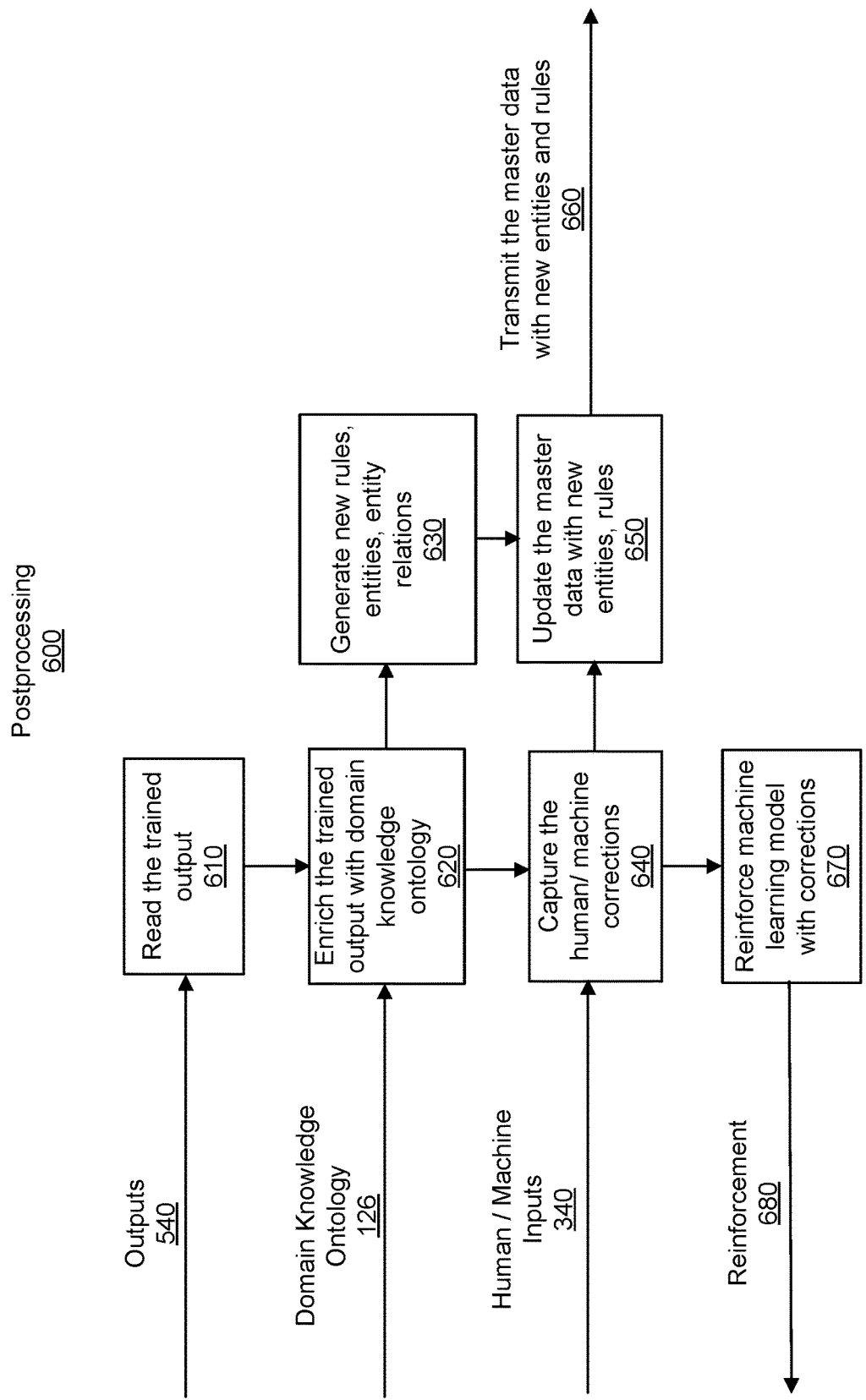
FIG. 6 is a block diagram illustrating an example post-processing stage, in accordance with an embodiment.

FIG. 6 is a block diagram illustrating an example post-processing stage 600, in accordance with an embodiment.

The computing server may perform post-processing by reading 610 the outputs 540 from the entity extraction stage 500. The outputs may include sequences of named entities, such as natural language phrases representing relationships between entities, and the like. The computing server 130 may enrich 620 each of the outputs with domain knowledge ontology 126.

The domain knowledge ontology 126 may be used to resolve ambiguity in the outputs and supplement other information absent from the outputs. In one case example, an output may include a shipment number that starts with the letter "I." The domain knowledge ontology 126 may include information that a shipment number starting with the letter "I" refers to an international shipment. The shipment being international initially may not be captured in the generated outputs. The computing server 130 may augment the outputs based on this piece of knowledge. In another case example, the domain knowledge ontology 126 may include information that a retail store receives all products from a particular warehouse. An output sequence may not capture the warehouse but the information may be augmented to the sequence based on the domain knowledge ontology 126.

The computing server 130 may generate 630 new rules, entities, and entity relationships based on the enriched outputs. For example, the computing server 130 may identify new RDF triplets from one of the newly generated sequences that are compiled from various unstructured data. The sequence may identify that a named entity has performed a certain action with another named entity so that a new relationship may be established and saved as a new RDF triplet. In another case, new named entities and new named entity types (e.g., new products, new group of customers, new employee positions) are identified in the unstructured data. The new named entities may have new rules or relationships that could impact the master data 114 and the master data schema 116. Business rules may also be identified from the output sequences 540.

The computing server 130 may read 640 human/machine correction 340 that manually corrects errors in the model outputs, such as errors in the natural language phrases, and errors in newly generated rules and entity relationships. For example, the computing server may receive a correction of at least one of the new types of named entities or new relationship definitions from a user of the domain 110. Based on the human/machine corrections 340, the computing server 130 may update 650 master data 114 with new entities and rules identified by the human/machine corrections and transmit 660 the updates to the domain 110. For example, the computing server may add one or more new types of named entities or the new relationship definitions to the master data 114 or the master data schema 116. The computing server 130 may additionally reinforce 670 the training of the machine learning model (e.g., the LSTM) of the entity extraction stage 500 based on the improved results based on the human/machine corrections 340, domain knowledge ontology 126, and the like. The computing server 130 may provide the reinforcement 680 to the entity extraction stage 500 by providing additional training data. For example, the computing server 130 may use one or more new types of named entities or one or more new relationship definitions to further training the machine learning model that is used to extract the named entities from unstructured data.

Figure 7:
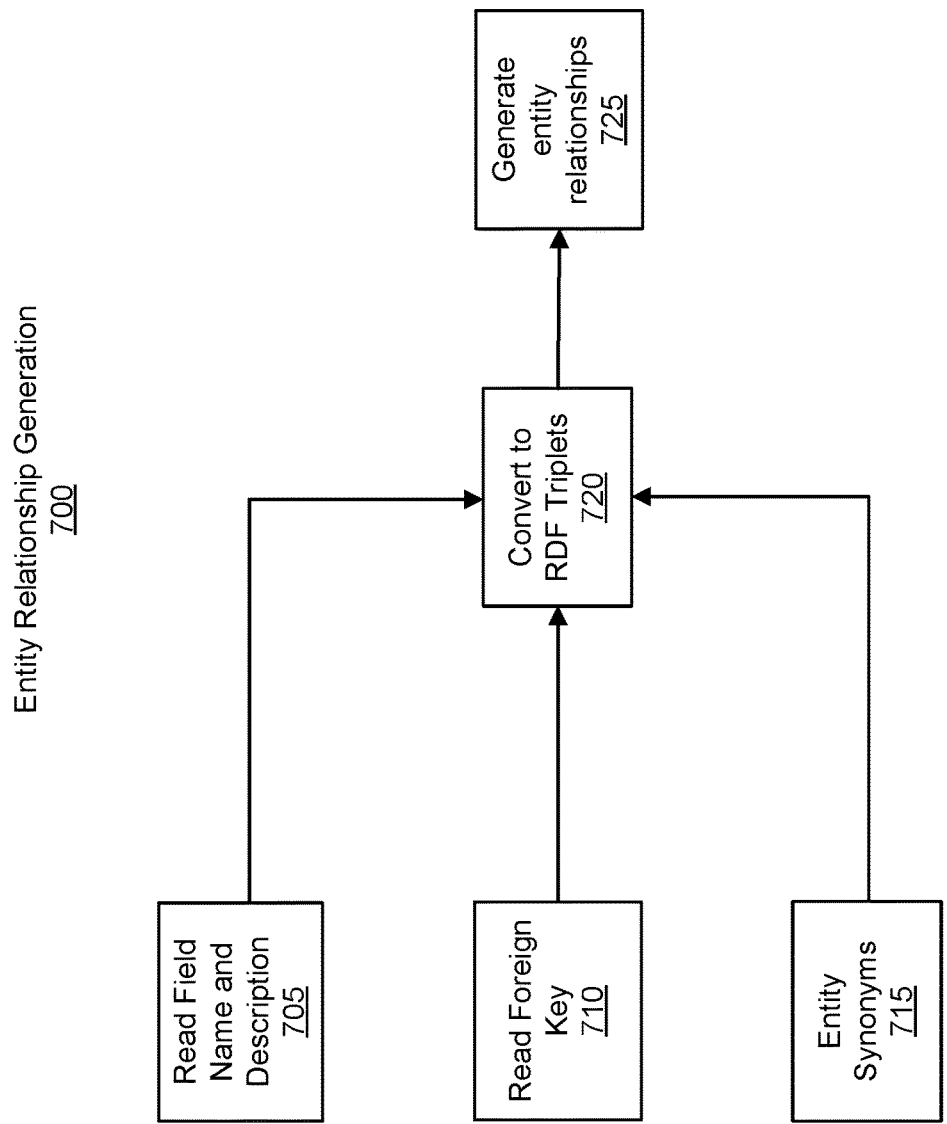
FIG. 7 is a block diagram illustrating an example entity relationship generation process, in accordance with an embodiment.

FIG. 7 is a block diagram illustrating an example process 700 to generate a new entity relationship or a new relationship definition, in accordance with an embodiment. In an embodiment, the process 700 may correspond to the generation 630 of the entity relationship performed by the computing server 130 during a post-processing stage 600 in order to generate 630 new rules, entities, and entity relationships based on domain knowledge ontology 126. In some embodiments, the computing server 130 may perform fewer, additional, or different steps than the ones shown in FIG. 7.

The computing server 130 may use newly generated output sequences 540 and master data schema 116 to generate new entity relationships. For example, from master data schema 116, the computing server 130 may read 705 a field name and description for an entity or object extracted from unstructured data sources 112. The computing server 130 may also read 710 foreign keys, which may be possible keys that are associated with a type of named entities as identified in the field name and description 705. For example, a newly identified named entity from an output sequence 540 may be a new person, whom the computing server 130 labels as a new employee. Based on the name field and description 705 of employees as indicated in the master data schema 116, the computing server 130 may identify one or more foreign keys that are associated with employees. For example, the foreign keys may be employee department, employee email, employee job title, etc. Each foreign key may be linked to additional data values. The computing server 130 may also read entity synonyms 715. For example, employees may have the synonyms of sales, engineers, etc., depending on the job position of the new person. The synonyms may also be associated with additional foreign keys 710 that include additional attributes of the employee. Based on the read information, the computing server 130 converts 720 information describing the entities and objects extracted from the unstructured data sources 112 to RDF triplets. The RDF triplets are used to generate 725 or update entity or object relationships. For example, the computing server 130, based on the field name and description 705 and foreign keys 710, may identify one or more attributes of the new person and define RDF triplets of the new person as a new employee whose attributes (e.g., grading, job positions, salary, profile information) may be linked to additional RDF triplets.

Example Interface

FIG. 8 is an example interface illustrating a natural language phrase describing a relationship of a set of named entities based on unstructured data, in accordance with an embodiment. In the example interface of FIG. 8, the unstructured data source is identified as an email document 805. A computing server 130 applies an entity extraction process 500 to the email document. The computing server 130 may additionally apply a preprocessing stage 400 and post-processing stage 600 to the email document, as described in conjunction with FIGS. 4 and 6.

During the applied processes, the computing server 130 may receive a master data schema and domain knowledge ontology of a domain 110. The domain knowledge ontology 126 includes relationship definitions in the domain 110. The computing server 130 may identify targeted types of named entities of the domain 110 from the master data schema 116 according to the relationship definitions in the domain knowledge ontology. In some examples, the computing server 130 may identify targeted types of named entities of the domain based on additional information, such as human/machine corrections and the like. The computing server 130 may extract a plurality of named entities from the unstructured data of the domain according to the targeted types of named entities identified. The computing server 130 may generate one or more sequences of named entities. At least one of the named entities in the sequences is extracted from the unstructured data. The computing server 130 assigns entity labels to the named entities in the one or more sequences. The entity label for one of the named entities in the sequence is assigned based at least on another entity label in the sequence. The computing server 130 generates, based on the entity labels, one or more natural language phrases describing a relationship of a set of named entities identified in the one or more sequences.

In the example interface of FIG. 8, the generated natural language phrase 815 describes a relationship between one or more entities 820 associated with the unstructured data source. For example, the computing server 130 may extract information describing an order number 820A and a delivery number 820B from one or more email documents. Based on the order number 820A, the delivery number 820B, and additional information such as human/bot feedback 340, domain knowledge ontology 126, and the like, the computing server 130 generates the natural language phrase describing the relationship between the order number 820A ("the order 1001") and the delivery number 820B ("the delivery number [is] 40005") to produce the displayed phrase "The order 1001 needs to be shipped to location Houston, in Texas by Feb. 1, 2018. The related delivery number is 40005." The natural language phrase may be automatically generated by computing server 130 using information extracted from data in various unstructured data. The generated natural language phrase may be a summary of the status of a named entity. The generated natural language phrase may be used for automatic status retrieval or may be inserted as a sentence to be sent to one or more users. For example, automatic status email in natural language can be generated in this manner.

Computing Machine Architecture

Figure 9:
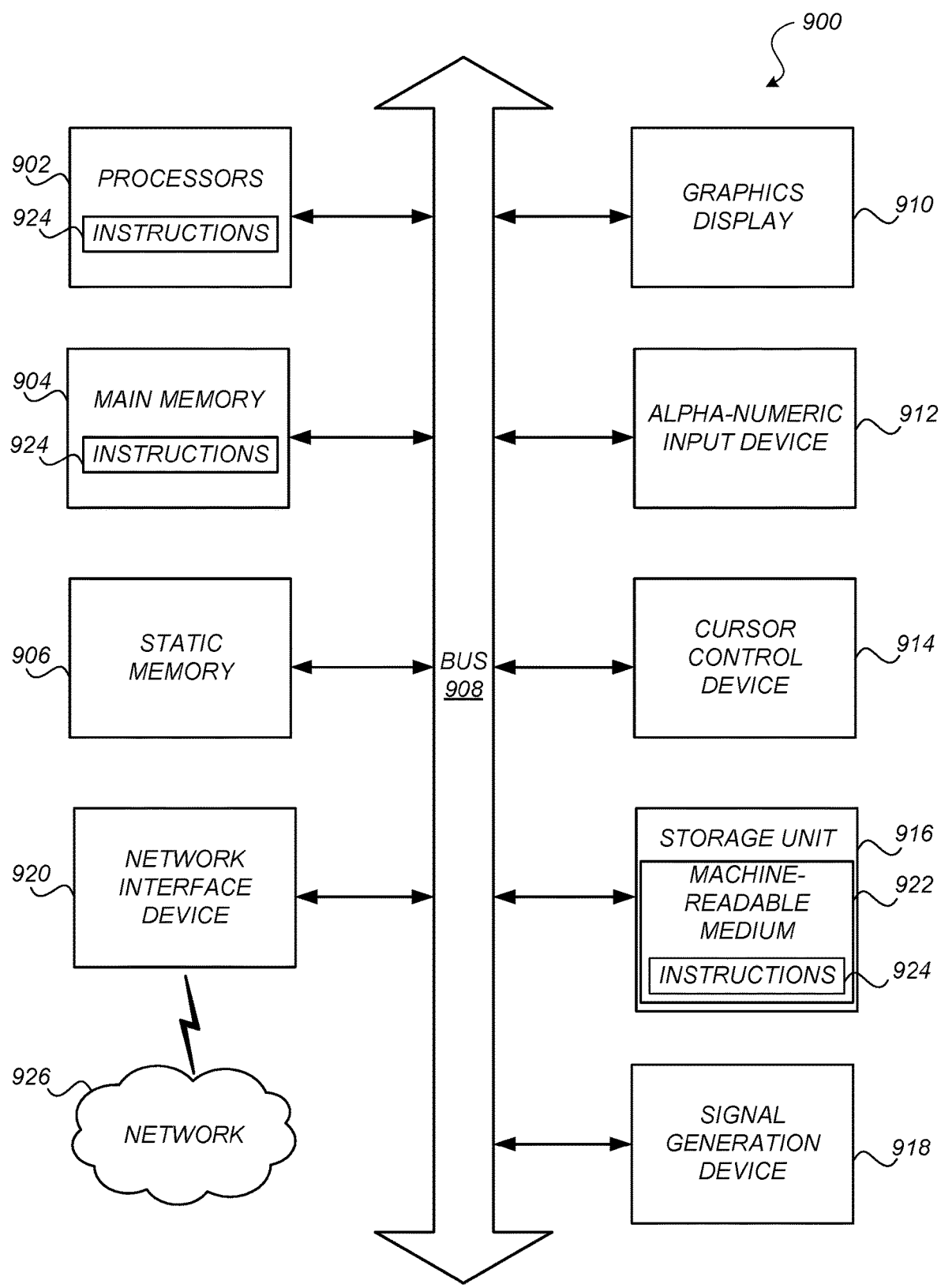
FIG. 9 is a block diagram illustrating components of an example computing machine, in accordance with an embodiment.

FIG. 9 is a block diagram illustrating components of an example computing machine that is capable of reading instructions from a computer-readable medium and execute them in a processor (or controller). A computer described herein may include a single computing machine shown in FIG. 9, a virtual machine, a distributed computing system that includes multiples nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIG. 1, including but not limited to, the domain 110, the computing server 130, and various engines, interfaces, terminals, and machines shown in FIG. 1. While FIG. 9 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" and "computer" may also be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 900 may also include a memory 904 that store computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 902 and reduces the space required for the memory 904. For example, the machine learning methods described herein reduces the complexity of the computation of the processors 902 by applying one or more novel techniques that simplify the steps in training, reaching convergence, and generating results of the processors 902. The algorithms described herein also reduces the size of the models and datasets to reduce the storage space requirement for memory 904.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processors 902, displays a graphical user interface (GUI) to display one or more results and data generated by the processes described herein. The computer system 900 may also include alphanumeric input device 912 (e.g., a keyboard), a cursor control device 914 (e.g., a mouse, a trackball, a joystick, a motion sensor, or other pointing instrument), a storage unit 916 (a hard drive, a solid state drive, a hybrid drive, a memory disk, etc.), a signal generation device 918 (e.g., a speaker), and a network interface device 920, which also are configured to communicate via the bus 908.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the processors (e.g., processors 902) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, a computing server that extracts entity and object information from unstructured data of a domain to generate a natural language representation of the unstructured data may reduce the computing time of the domain generating data structure for to the unstructured data. The computing server achieves efficient and effective data and process management of the domain by extracting objects and connecting objects and events from various unstructured sources that are seemingly unrelated. This allows named entity relationships and definitions that are conventionally challenging to discover to be automatically and systematically identified. This also reduces the complexity of databases by allowing unstructured data to play a role in generating meaning processes and structured information, sometimes without the need of converting the text and documents in unstructured sources to structured databases.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
receiving a master data schema and domain knowledge ontology of a domain, the domain knowledge ontology comprising relationship definitions in the domain;

identifying targeted types of named entities of the domain from the master data schema according to at least the relationship definitions in the domain knowledge ontology by:
  converting entity types defined in the master data schema to a plurality of domain grammar definitions in a resource description framework format;
  deriving relationships among the entity types in the domain grammar definitions;
  augmenting the relationships among the entity types with the domain knowledge ontology; and
  identifying the targeted types of named entities from the plurality of domain grammar definitions;
extracting a plurality of named entities from unstructured data of the domain according to the targeted types of named entities identified;
generating one or more sequences of named entities, at least one of the named entities in the sequences extracted from the unstructured data;
assigning entity labels to the named entities in the one or more sequences, the entity label for one of the named entities in a sequence assigned based at least on another entity label in the sequence; and
generating, based on the entity labels, one or more natural language phrases describing a relationship of a set of named entities identified in the one or more sequences.

2. The computer-implemented method of claim 1, further comprising:
  enriching at least one of the sequences with the domain knowledge ontology.

3. The computer-implemented method of claim 1, wherein at least one of the targeted types of named entities identified is corrected manually.

4. The computer-implemented method of claim 1, wherein the unstructured data comprises emails of the domain.

5. The computer-implemented method of claim 1, wherein extracting the plurality of named entities from the unstructured data comprises:
  converting words in the unstructured data into word embedding vectors;
  inputting the word embedding vectors into a machine learning model; and
  extracting the name entities in the unstructured data using the machine learning model.

6. The computer-implemented method of claim 5, wherein the machine learning model is a long short term memory (LSTM) neural network.

7. The computer-implemented method of claim 1, wherein assigning entity labels to the named entities in the one or more sequences is based on a conditional probability of assigning the entity label for the one of the named entities in one of the sequences given another entity label assigned in the one of the sequences.

8. The computer-implemented method of claim 1, further comprising:
  generating one or more new types of named entities or one or more new relationship definitions of the domain knowledge ontology of the domain based on the one or more sequences; and
  adding the one or more new types of named entities or the one or more new relationship definitions to the master data schema.

9. The computer-implemented method of claim 8, further comprising:
  receiving a correction of at least one of the one or more new types of named entities or the one or more new relationship definitions.

10. The computer-implemented method of claim 8, further comprising:
  performing additional training of a machine learning model using the one or more new types of named entities or the one or more new relationship definitions, the machine learning model being used to extract the plurality of named entities from unstructured data.

11. A system, comprising:
a domain including a master data schema and domain knowledge ontology, the domain knowledge ontology comprising relationship definitions in the domain; and
a computing server comprising a memory and at least one processor, the memory comprising instructions executable by the at least one processor, the instructions, when executed, cause the at least one processor to:
  identify targeted types of named entities of the domain from the master data schema according to at least the relationship definitions in the domain knowledge ontology by:
    converting entity types defined in the master data schema to a plurality of domain grammar definitions in a resource description framework format;
    deriving relationships among the entity types in the domain grammar definitions;
    augmenting the relationships among the entity types with the domain knowledge ontology; and
    identifying the targeted types of named entities from the plurality of domain grammar definitions;
  extract a plurality of named entities from unstructured data of the domain according to the targeted types of named entities identified;
  generate one or more sequences of named entities, at least one of the named entities in the sequences extracted from the unstructured data;
  assign entity labels to the named entities in the one or more sequences, the entity label for one of the named entities in a sequence assigned based at least on another entity label in the sequence; and
  generate, based on the entity labels, one or more natural language phrases describing a relationship of a set of named entities identified in the one or more sequences.

12. The system of claim 11, wherein the instructions, when executed, cause the at least one processor to:
  enrich at least one of the sequences with the domain knowledge ontology.

13. The system of claim 11, wherein at least one of the targeted types of named entities identified is corrected manually.

14. The system of claim 11, wherein the instruction, when executed, causing the at least one processor to extract the plurality of named entities from the unstructured data comprises instructions, when executed, causing the at least one processor to:
  convert words in the unstructured data into word embedding vectors;
  input the targeted types of named entities identified and the word embedding vectors into a machine learning model; and
  extract the name entities in the unstructured data using the machine learning model.

15. The system of claim 14, wherein the machine learning model is a long short term memory neural network.

16. The system of claim 11, wherein the instruction, when executed, causing the at least one processor to assign entity labels to the named entities in the one or more sequences comprises instructions, when executed, causing the at least one processor to assign one of the entity labels based on a conditional probability of assigning the one of the entity labels in one of the sequences given another entity label assigned in the one of the sequences.

17. A non-transitory computer readable medium for storing computer code comprising instructions, when executed by at least one processor, cause the at least one processor to:
    receive a master data schema and domain knowledge ontology of a domain, the domain knowledge ontology comprising relationship definitions in the domain;
    identify targeted types of named entities of the domain from the master data schema according to at least the relationship definitions in the domain knowledge ontology by:
        converting entity types defined in the master data schema to a plurality of domain grammar definitions in a resource description framework format;
        deriving relationships among the entity types in the domain grammar definitions;
        augmenting the relationships among the entity types with the domain knowledge ontology; and
        identifying the targeted types of named entities from the plurality of domain grammar definitions;
    extract a plurality of named entities from unstructured data of the domain according to the targeted types of named entities identified;
    generate one or more sequences of named entities, at least one of the named entities in the sequences extracted from the unstructured data;
    assign entity labels to the named entities in the one or more sequences, the entity label for one of the named entities in a sequence assigned based at least on another entity label in the sequence; and
    generate, based on the entity labels, one or more natural language phrases describing a relationship of a set of named entities identified in the one or more sequences.

* * * * *